(12) United States Patent
Venkumahanti et al.

(10) Patent No.: US 8,972,642 B2
(45) Date of Patent: Mar. 3, 2015

(54) LOW LATENCY TWO-LEVEL INTERRUPT CONTROLLER INTERFACE TO MULTI-THREADED PROCESSOR

(75) Inventors: Suresh K. Venkumahanti, Austin, TX (US); Lucian Codrescu, Ausgin, TX (US); Erich James Plondke, Austin, TX (US); Xufeng Chen, San Diego, CA (US); Peixin Zhong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 13/252,670

(22) Filed: Oct. 4, 2011

(65) Prior Publication Data

US 2013/0086290 A1    Apr. 4, 2013

(51) Int. Cl.
*G06F 13/24*    (2006.01)
*G06F 13/32*    (2006.01)

(52) U.S. Cl.
CPC ..................................... *G06F 13/24* (2013.01)
USPC ......................................... 710/260; 710/269

(58) Field of Classification Search
USPC ................................................ 710/260–269
See application file for complete search history.

(56) References Cited

U.S. PATENT DOCUMENTS

| | | | |
|---|---|---|---|
| 4,420,806 A * | 12/1983 | Johnson et al. | 710/269 |
| 5,367,689 A * | 11/1994 | Mayer et al. | 710/260 |
| 5,530,872 A * | 6/1996 | Smeltzer et al. | 710/260 |
| 5,555,420 A * | 9/1996 | Sarangdhar et al. | 710/266 |
| 5,708,818 A | 1/1998 | Munz et al. | |
| 5,745,772 A | 4/1998 | Klein | |
| 5,905,897 A * | 5/1999 | Chou et al. | 710/260 |
| 5,931,937 A * | 8/1999 | Klein | 710/269 |
| 5,944,809 A * | 8/1999 | Olarig et al. | 710/260 |
| 6,470,407 B1 * | 10/2002 | Losi | 710/264 |

(Continued)

FOREIGN PATENT DOCUMENTS

| | | | | |
|---|---|---|---|---|
| CN | 101382910 A | * | 3/2009 | G06F 9/48 |
| CN | 102609311 A | * | 7/2012 | G06F 9/50 |

(Continued)

OTHER PUBLICATIONS

Definition of "instruction", thefreedictionary.com (citing The American Heritage Dictionary of the English Language, Fourth Edition, 2000, Houghton Mifflin Company), retrieved from the Internet at <www.thefreedictionary.com/p/instruction> on Mar. 29, 2014.*

(Continued)

*Primary Examiner* — Faisal M Zaman
(74) *Attorney, Agent, or Firm* — Peter Michael Kamarchik; Nicholas J. Pauley; Joseph Agusta

(57) ABSTRACT

Systems and method for reducing interrupt latency time in a multi-threaded processor. A first interrupt controller is coupled to the multi-threaded processor. A second interrupt controller is configured to communicate a first interrupt and a first vector identifier to the first interrupt controller, wherein the first interrupt controller is configured to process the first interrupt and the first vector identifier and send the processed interrupt to a thread in the multi-threaded processor. Logic is configured to determine when the multi-threaded processor is ready to receive a second interrupt. A dedicated line is used to communicate an indication to the second interrupt controller that the multi-threaded processor is ready to receive the second interrupt.

29 Claims, 4 Drawing Sheets

(56) References Cited

U.S. PATENT DOCUMENTS

| | | | | |
|---|---|---|---|---|
| 6,477,600 | B1* | 11/2002 | Baxter et al. | 710/260 |
| 6,535,943 | B1* | 3/2003 | Hatamori et al. | 710/261 |
| 6,734,984 | B2* | 5/2004 | Prenn et al. | 358/1.12 |
| 7,051,146 | B2* | 5/2006 | Nguyen et al. | 710/305 |
| 7,237,051 | B2* | 6/2007 | Bennett et al. | 710/260 |
| 7,350,005 | B2 | 3/2008 | Yiu et al. | |
| 7,657,683 | B2 | 2/2010 | Sridhar et al. | |
| 7,849,247 | B2 | 12/2010 | Marietta et al. | |
| 2001/0052043 | A1* | 12/2001 | Pawlowski et al. | 710/260 |
| 2004/0073735 | A1* | 4/2004 | Boom et al. | 710/260 |
| 2004/0111593 | A1 | 6/2004 | Arimilli et al. | |
| 2004/0117532 | A1* | 6/2004 | Bennett et al. | 710/260 |
| 2004/0225790 | A1* | 11/2004 | George et al. | 710/260 |
| 2005/0010707 | A1* | 1/2005 | Francis | 710/260 |
| 2005/0144346 | A1* | 6/2005 | Barth et al. | 710/260 |
| 2006/0036791 | A1* | 2/2006 | Jeyasingh et al. | 710/260 |
| 2007/0204087 | A1* | 8/2007 | Birenbach et al. | 710/264 |
| 2008/0141277 | A1* | 6/2008 | Traut et al. | 719/313 |
| 2008/0155153 | A1* | 6/2008 | Yoshii et al. | 710/262 |
| 2009/0070511 | A1* | 3/2009 | Kaushik et al. | 710/267 |
| 2010/0036987 | A1* | 2/2010 | Streett et al. | 710/269 |
| 2010/0217905 | A1* | 8/2010 | Arimilli et al. | 710/263 |
| 2011/0087815 | A1* | 4/2011 | Kruglick | 710/260 |
| 2011/0173361 | A1* | 7/2011 | Nishida et al. | 710/260 |
| 2011/0202699 | A1* | 8/2011 | van Riel | 710/267 |
| 2012/0144081 | A1* | 6/2012 | Smith et al. | 710/269 |
| 2013/0067132 | A1* | 3/2013 | Guddeti et al. | 710/260 |

FOREIGN PATENT DOCUMENTS

| | | | | |
|---|---|---|---|---|
| CN | 103874990 A | * | 10/2012 | G06F 13/24 |
| DE | 19501674 A1 | * | 8/1995 | G06F 15/167 |
| WO | 2006090329 A1 | | 8/2006 | |

OTHER PUBLICATIONS

Tumeo et al., "An Interrupt Controller for FPGA-based Multiprocessors," Embedded Computer Systems: Architectures, Modeling and Simulation, 2007. IC-SAMOS 2007. International Conference on , pp. 82-87, Jul. 16-19, 2007.*

Halang et al., "A high-precision timing and interrupt controller to support distributed real-time operating systems," Circuits and Systems, 1995., Proceedings., Proceedings of the 38th Midwest Symposium on , pp. 9-12, vol. 1, Aug. 13-16, 1995.*

Otani et al., "An 80 Gbps dependable multicore communication SoC with PCI express I/F and intelligent interrupt controller," Cool Chips XIV, 2011 IEEE , pp. 1-3, Apr. 20-22, 2011.*

Chipin et al., "Design of a configurable multichannel interrupt controller," Circuits,Communications and System (PACCS), 2010 Second Pacific-Asia Conference on , vol. 1, pp. 327-330, Aug. 1-2, 2010.*

International Search Report and Written Opinion—PCT/US2012/058780—ISA/EPO—Apr. 5, 2013.

* cited by examiner

LOW LATENCY TWO-LEVEL INTERRUPT CONTROLLER INTERFACE TO MULTI-THREADED PROCESSOR

FIELD OF DISCLOSURE

Disclosed embodiments are directed to techniques for handling interrupts in processors. More particularly, exemplary embodiments are directed to systems and methods for reducing interrupt latency in two level interrupt controllers configured for multi-threaded processors.

BACKGROUND

Processing systems commonly support interrupt mechanisms, wherein an interrupt may asynchronously halt or suspend a current execution thread or instruction stream of a processor, such that the interrupt may be serviced. An interrupt may be generated from various sources, including on-chip or off-chip external devices. Interrupts may also be generated internally within a processor or CPU, such as from one or more threads in a multi-threaded processor.

In order to service an interrupt, an interrupt service routine (ISR) may be executed by the processor receiving the interrupt. Each interrupt may include a particular ISR associated with the interrupt. Because interrupts may be received from various sources, an interrupt controller is commonly used to handle the tasks of receiving the interrupts, prioritizing among several outstanding interrupts, and tracking the status of pending interrupts such that a processor's availability to process new interrupts may be ascertained. In order to keep track of interrupts and associated sources and ISRs, a vectored interrupt controller (VIC) is known in the art to track vectored addresses associated with each interrupt, such that the VIC may be enabled to provide the processor servicing the interrupt with the associated ISR.

In the case of multi-threaded processors configured to execute two or more threads in parallel, priority levels may be dynamically or statically assigned to the threads, in order for an interrupt controller to determine which thread should be interrupted in order to service an interrupt. A first level or L1 interrupt controller may be configured, for example, to handle interrupts related to a processor core, such as a multi-threaded processor. A second level or L2 interrupt controller may be configured, for example, to handle interrupts from external devices or interrupts on a global scale. The L2 interrupt controller may be in communication with the L1 interrupt controller through system buses such as AHB/AXI to direct interrupts accordingly from the L2 to the L1 interrupt controller. Two-level interrupt controllers, such as L1 and L2 interrupt controllers, may find several other applications in processing systems, as will be recognized by one of ordinary skill in the art.

With reference to FIG. 1, a conventional implementation of a two-level interrupt controller is provided. L2 interrupt controller 102 may communicate an interrupt over bus 108 to L1 interrupt controller 104, which may be attached to core 106. As shown, core 106 is in direct communication with only L1 interrupt controller 104, and not L2 interrupt controller 102. Initially, L1 interrupt controller 104 may receive a first interrupt from L2 interrupt controller 102. Thereafter, the processing of subsequent interrupts may be handled in one of two ways, for example, based on processor resources.

In a first scenario, immediately upon receipt of the first interrupt, core 106 may provide an indication to L2 interrupt controller 102, through L1 interrupt controller 104, that the core 106 is ready for a new interrupt. L2 interrupt controller 102 may then send the processor core a second interrupt if a second interrupt is pending at L2 interrupt controller 102. For instance, if core 106 is configured as a multi-threaded processor, the first interrupt may be serviced by a first thread of the multi-threaded processor, and a second thread may be in WAIT state, and available to process a second interrupt. In this instance, the multi-threaded processor may provide an indication L2 interrupt controller 102, for example, via L1 interrupt controller 104, that L2 interrupt controller 102 may send a second interrupt, immediately after the processor core receives the first interrupt.

Alternately, in a second scenario, core 106 may provide indication to L2 interrupt controller 102 to defer sending any new requests until a later point in time or until further notice. Once again, if core 106 is configured as a multi-threaded processor, all the threads may be busy, and the real-time operating system (RTOS) associated with the processor core may require a time delay in order to determine which thread to interrupt. For example, the RTOS may determine which hardware thread is running a software thread with the least priority, and designate that thread as the lowest priority software thread, such that L1 interrupt controller 104 may direct a second interrupt from L2 interrupt controller 102 to the lowest priority software thread. The determination of the lowest priority software thread may incur significant time delay, and correspondingly, the rate at which interrupts can be processed suffers degradation.

Moreover, in conventional data processing systems, information regarding interrupts, such as vectored addresses associated with the interrupt's ISR, is communicated between L2 interrupt controller 102 and L1 interrupt controller 104 over an Advanced Microcontroller Bus Architecture High Performance Bus (AHB). The process associated with reading the AHB in order to retrieve the above information may add a significant delay to the interrupt latency, and thus further impact the rate at which interrupts are processed.

In order to mitigate the aforementioned problems associated with conventional interrupt handling, there is a need in the art for solutions including low latency two-level interrupt controllers.

SUMMARY

Exemplary embodiments of the invention are directed to systems and method for reducing interrupt latency in two level interrupt controllers configured for multi-threaded processors.

For example, an exemplary embodiment is directed to a method for reducing interrupt latency time, comprising: communicating a first interrupt and a first vector identifier from a second interrupt controller to a first interrupt controller; processing the first interrupt and the first vector identifier at the first interrupt controller; sending the processed interrupt from the first interrupt controller to a thread in a core; determining when the core is ready to receive a second interrupt; and sending an instruction from the core to the second interrupt controller indicating the core is ready to receive the second interrupt.

Another exemplary embodiment is directed to a multi-threaded processor, comprising: a core, a level two interrupt controller, and a line coupling the core to the level two interrupt controller, wherein the core is configured to indicate to the level two interrupt controller, via the line, that the core is ready to receive a level two interrupt.

Yet another exemplary embodiment is directed to a processing system configured for reduced interrupt latency, the processing system comprising: a first interrupt controller coupled to a core; means for communicating a first interrupt and a first vector identifier from a second interrupt controller to the first interrupt controller; means for processing the first interrupt and the first vector identifier at the first interrupt controller; means for sending the processed interrupt to a thread in the core; means for determining when the core is ready to receive a second interrupt; and means for sending an instruction from the core to the second interrupt controller indicating the core is ready to receive the second interrupt.

Another exemplary embodiment is directed to a non-transitory computer-readable storage medium comprising code, which, when executed by a processor, causes the processor to perform operations for reducing interrupt latency time, the non-transitory computer-readable storage medium comprising: code for communicating a first interrupt and a first vector identifier from a second interrupt controller to a first interrupt controller; code for processing the first interrupt and the first vector identifier at the first interrupt controller; code for sending the processed interrupt from the first interrupt controller to a thread in a core; code for determining when the core is ready to receive a second interrupt; and code for sending an instruction from the core to the second interrupt controller indicating the core is ready to receive the second interrupt.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
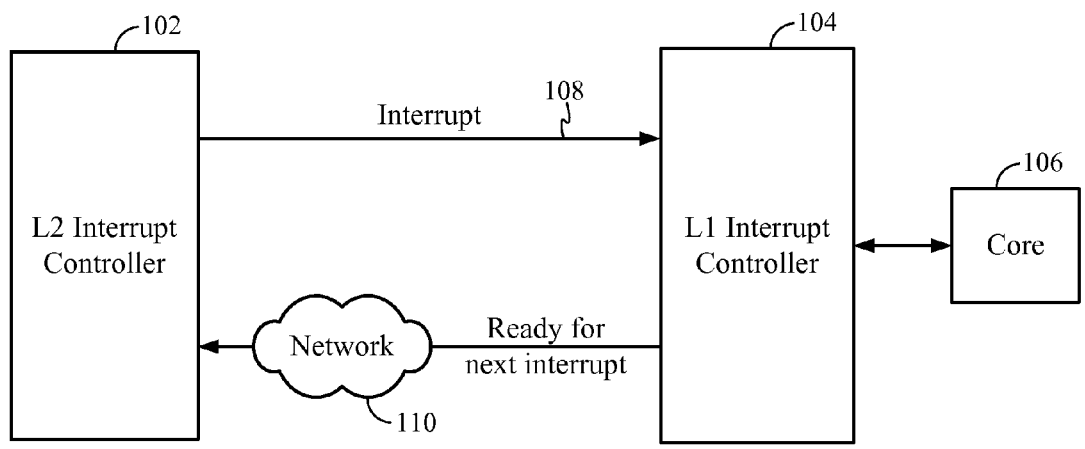
FIG. 1 illustrates a conventional two-level interrupt controller interface to a core.

As previously described with reference to FIG. 1, conventional two-level interrupt controllers suffer from drawbacks. When core 106 is ready for accepting a new interrupt, such indication is provided to L2 interrupt controller 102 through L1 interrupt controller 104, over a long latency network 110, such as an AHB bus. Such conventional handling of interrupts incurs severe delays and leads to low rate of interrupt processing.

In contrast to the above conventional techniques, exemplary embodiments are directed to low latency interrupt controllers configured for high rate of interrupt processing. More particularly, embodiments may include two-level low latency interrupt controllers which may be interfaced to multi-threaded processor cores.

Figure 2:
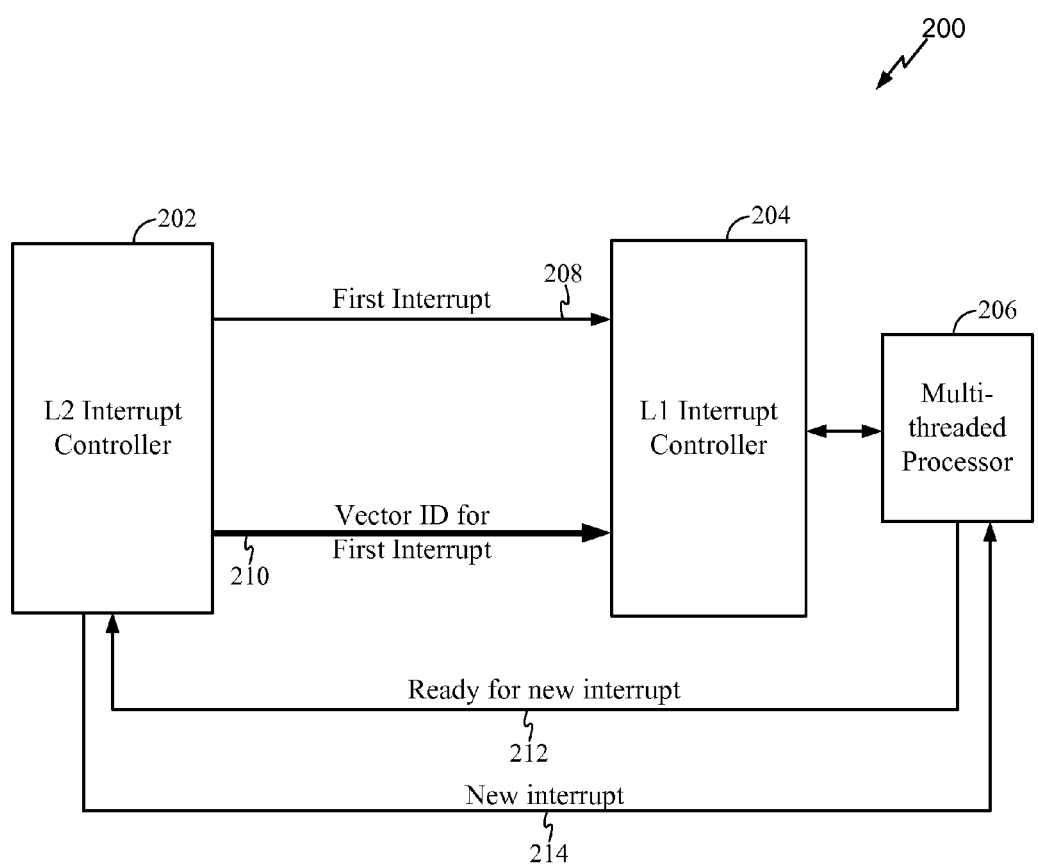
FIG. 2 illustrates a two-level interrupt controller interface to a multi-threaded processor, configured according to exemplary embodiments.

With reference now to FIG. 2, there is illustrated system 200 comprising an L1 interrupt controller 204, which may be configured for direct interfacing with multi-threaded processor 206. L1 interrupt controller 204 may handle interrupts directed to the multi-threaded processor from one or more devices, including L2 interrupt controller 202.

In one embodiment, both L1 and L2 interrupt controllers 204 and 202 may be a Vectored Interrupt Controller, such as previously described. Accordingly, the L2 interrupt controller 202 may be configured to send interrupts along with vector addresses associated with ISRs of the interrupts. According to a non-limiting illustration, the L2 interrupt controller 202 may support up to 1024 low-latency interrupts. The 1024 low latency interrupts may be prioritized by L2 interrupt controller 202. L1 interrupt controller 204 may be a VIC with 32 register entries [31:0], such that register entry [31] of L1 interrupt controller 204 may correspond to L2 interrupt controller 202. The remaining 31 register entries of L1 interrupt controller 204 may be reserved for interrupts from other sources, including interrupts that are generated internally from the two or more threads of multi-threaded processor 206 for thread-to-thread signaling, or for legacy applications. In the illustrated configuration of L1 and L2 interrupt controllers 204 and 202, all interrupts from external devices (not shown) may first be received at L2 interrupt controller 202 and thereafter may be directed to L1 interrupt controller 204.

For example, with continuing reference to FIG. 2, a first interrupt may be received by L2 interrupt controller 202 from an external device (not shown). The first interrupt may be communicated to L1 interrupt controller 204 over bus 208, along with corresponding vector ID on bus 210. A global vector ID register (not shown) may also be updated with the vector ID, wherein the global vector ID register may be accessible through a control register (CR) transfer instruction. The global vector ID register may assist in tracking interrupts. For example, the global VID register may be configured to track which specific L2 interrupt was sent to L1 interrupt controller 204.

Once the first interrupt is received by the L1 interrupt controller 204, embodiments may deviate from conventional techniques in several ways in order to expedite the handling of subsequent requests. While conventional techniques such as illustrated in FIG. 1, relied on hardware solutions to inform L2 interrupt controller 102 over network 110 regarding the availability of core 106 for accepting a new request, embodiments may include software routines configured for monitoring the readiness of multi-threaded processor 206. For example, a software routine may efficiently track the state of processes running on the two or more threads of multi-threaded processor 206. The software routine may determine whether one or more threads may be in a WAIT state to immediately accept a new interrupt, or if a low priority process running on a thread may be interrupted to immediately service a new interrupt.

Once the determination is made regarding the readiness of multi-threaded processor 206 to accept an interrupt, embodiments may include a single instruction to accomplish both: informing L1 interrupt controller 204 that the first interrupt has been accepted for processing and also informing L2 interrupt controller 202 that multi-threaded processor 206 is now ready for accepting a new interrupt. It will be recognized that these embodiments are not restrained by a conventional two-level interrupt framework, such as illustrated in FIG. 1, wherein core 106 may communicate its readiness to L2 interrupt controller 102 for a new interrupt only through network 110. On the other hand, embodiments may communicate the readiness of multi-threaded processor 206 directly to L2 interrupt controller 202, through a dedicated hardware line, such as line 212 in FIG. 2.

Moreover, some embodiments may also include a dedicated hardware port in multi-threaded processor 206, such that L2 interrupt controller 202 may directly communicate interrupts (e.g. "New interrupt" in FIG. 2) to multi-threaded processor 206 via a dedicated hardware line, such as line 214. In this manner, the communication of readiness from multi-threaded processor 206 to L2 interrupt controller 202, as well as subsequent communication of the interrupt from L2 interrupt controller 202 to multi-threaded processor 206 may altogether circumvent L1 interrupt controller 204 and the associated delays.

Exemplary embodiments may include a Clear Interrupt Auto Disable (CIAD) register. A CIAD instruction may be used to ensure that the same interrupt is not taken more than once. For example, multi-threaded processor 206 may automatically set the CIAD register as soon as a first interrupt is taken. Once it is determined, for example by a software routine as discussed previously, that multi-threaded processor 206 is ready for accepting a new interrupt, the software routine may trigger a CIAD instruction to be issued. The CIAD instruction may then clear the CIAD register to activate the interrupt line such that a new interrupt may be taken on the same line.

In one implementation, the CIAD instruction may be issued by multi-threaded processor 206 to both clear a status indicating that the first interrupt is pending at L1 interrupt controller 204 and also inform L2 interrupt controller 202 that multi-threaded processor 206 is ready to receive another interrupt and accompanying vector ID over buses 208 and 210 respectively. The CIAD instruction may be associated with register entry [31] of L1 interrupt controller 204, which as previously described, may be dedicated for interrupts from L2 interrupt controller 202. Thus, the CIAD instruction may provide an effective handshake mechanism between L2 interrupt controller 202, L1 interrupt controller 204 and multi-threaded processor 206. Once a first interrupt is received at L1 interrupt controller 204, the process, such as, a software routine, may be started to generate the CIAD instruction, for expediting the handling of subsequent interrupts. It will be understood that embodiments may also implement the above processes with dedicated hardware or a combination of hardware and software, without being limited to a software routine as discussed in the aforementioned example.

Moreover, embodiments may include implementations wherein register entry [31] of L1 interrupt controller 204 may be programmed to capture information on a rising edge of a clock. L2 interrupt controller 202 may be either edge triggered or level sensitive, and send interrupts and corresponding vector IDs to L1 interrupt controller 204 over buses 208 and 210 asynchronously. By configuring L1 interrupt controller 204 as edge triggered, the interrupts may be synchronized to a clock corresponding to multi-threaded processor 206. Such edge triggered configurations may enable improved communication protocols between L1 interrupt controller 204 and L2 interrupt controller 202.

Further, it will be recognized that mechanisms to inform L2 interrupt controller 202 about the readiness of multi-threaded processor 206, such as the CIAD instruction sent over dedicated bus 212, may be triggered prior to completion of the first interrupt. In other words, the first interrupt need not be completely processed by multi-threaded processor 206 in order for multi-threaded processor 206 to reach a stage of readiness to handle a new interrupt. In some embodiments, soon after the first interrupt is received at L1 interrupt controller, multi-threaded processor 206 may begin the transition to a state of readiness to accept a new interrupt, for example, by clearing register entry [31] of L1 interrupt controller 204.

Accordingly, by a combination of hardware and software configurations as discussed in the above sections, embodiments may significantly improve the rate of processing interrupts and also decrease the latency of interrupt processing.

Figure 3:
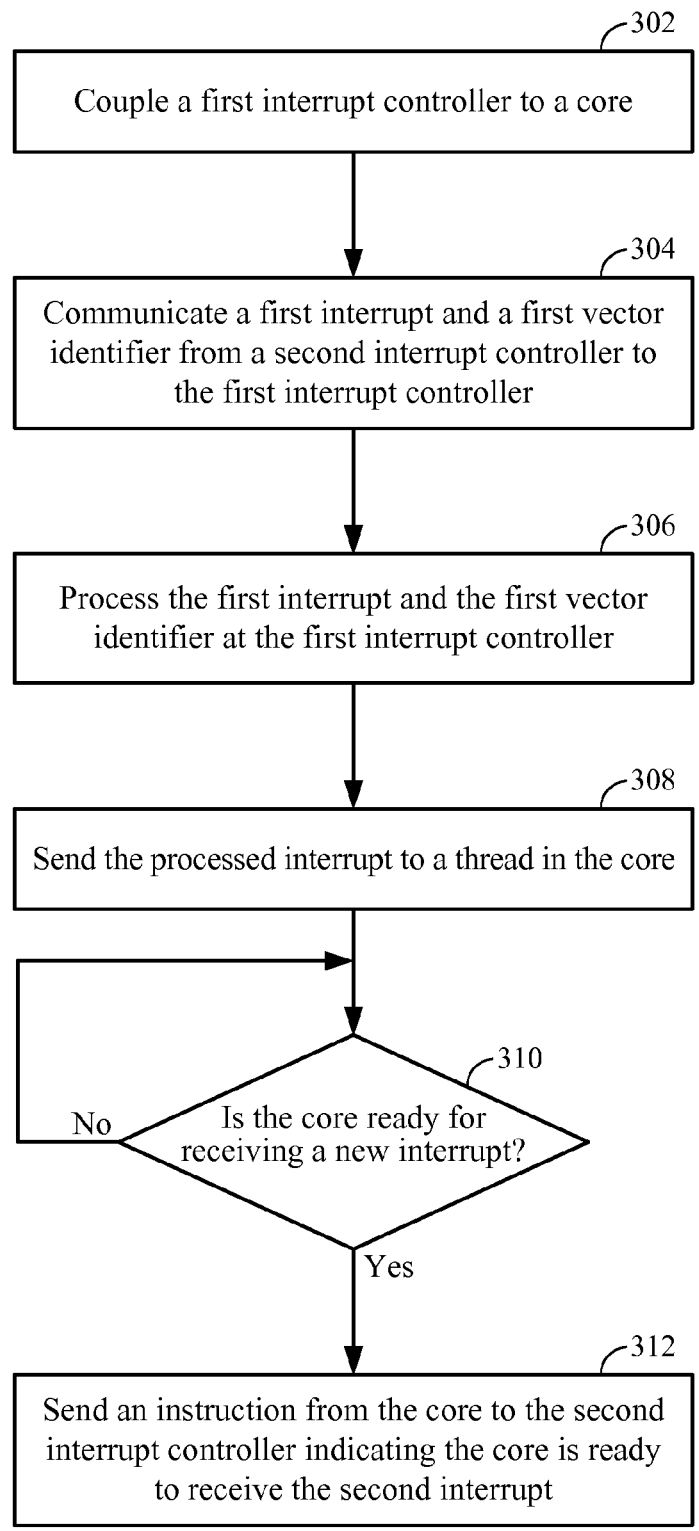
FIG. 3 illustrates a flow chart detailing a method for configuring a two-level interrupt controller interface to a multi-threaded processor according to exemplary embodiments.

Further, it will be appreciated that embodiments include various methods for performing the processes, functions and/or algorithms disclosed herein. For example, as illustrated in FIG. 3, an embodiment can include a method for reducing interrupt latency time, comprising: coupling a first interrupt controller, such as L1 interrupt controller 204, to a core, such as multi-threaded processor 206 (Block 302); communicating a first interrupt and a first vector identifier from a second interrupt controller, such as L2 interrupt controller 202 to the first interrupt controller, for example over buses 208 and 210 respectively (Block 304); processing the first interrupt and the first vector identifier at the first interrupt controller (Block 306); sending the processed interrupt to a thread in the core (Block 308); determining when the core is ready to receive a second interrupt (Block 310); and sending an instruction from the core to the second interrupt controller indicating the core is ready to receive the second interrupt (Block 312).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for reducing interrupt latency in a two-level interrupt controller interface to a multi-threaded processor. Accordingly, the invention is not limited to illustrated examples and any means for performing the functionality described herein are included in embodiments of the invention.

Figure 4:
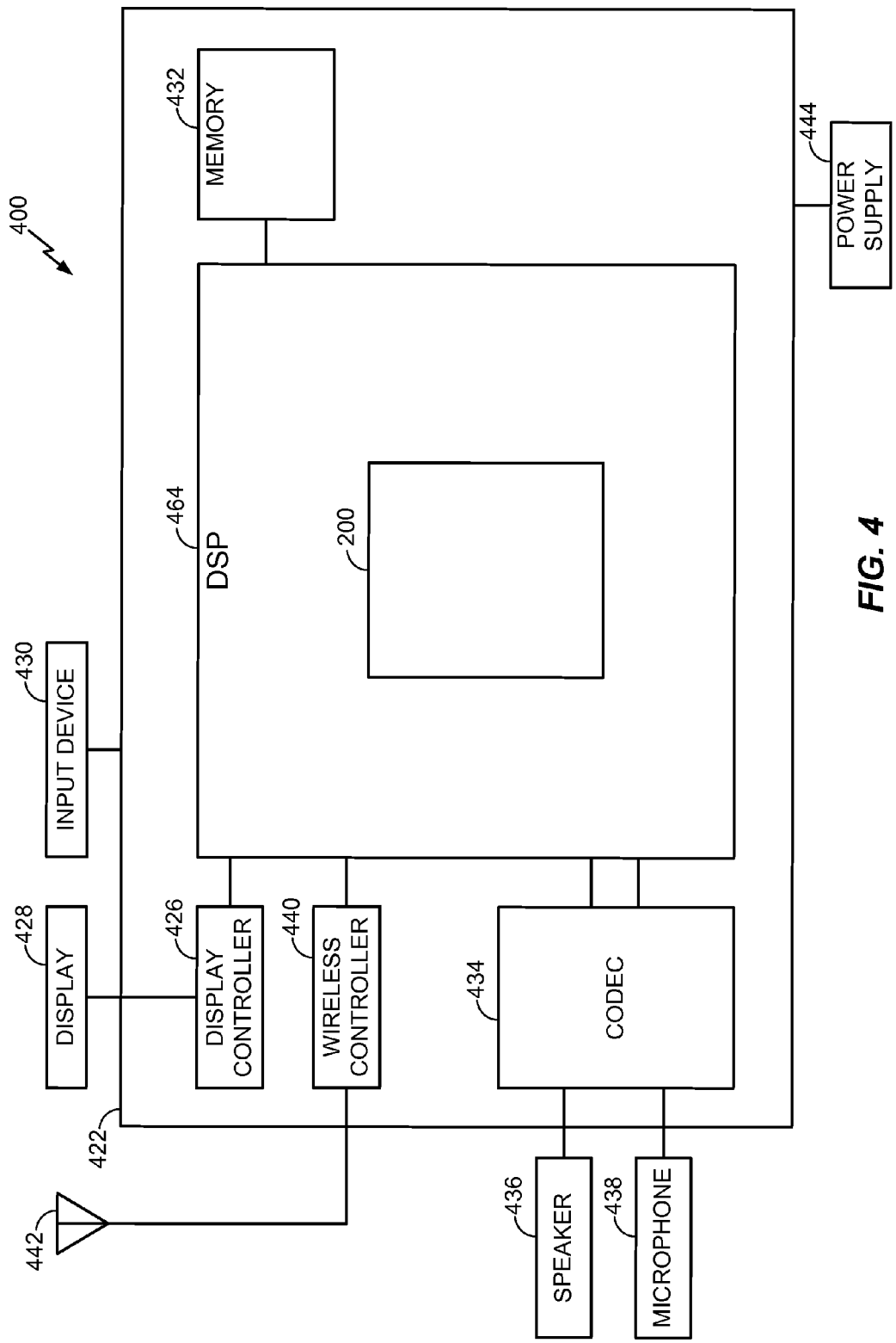
FIG. 4 illustrates an exemplary wireless communication system 400 in which an embodiment of the disclosure may be advantageously employed.

Referring to FIG. 4, a block diagram of a particular illustrative embodiment of a wireless device that includes a multi-core processor configured according to exemplary embodiments is depicted and generally designated 400. The device 400 includes a digital signal processor (DSP) 464 which may include system 200 of FIG. 2. FIG. 4 also shows display controller 426 that is coupled to DSP 464 and to display 428. Coder/decoder (CODEC) 434 (e.g., an audio and/or voice CODEC) can be coupled to DSP 464. Other components, such as wireless controller 440 (which may include a modem) are also illustrated. Speaker 436 and microphone 438 can be coupled to CODEC 434. FIG. 4 also indicates that wireless controller 440 can be coupled to wireless antenna 442. In a particular embodiment, DSP 464, display controller 426, memory 432, CODEC 434, and wireless controller 440 are included in a system-in-package or system-on-chip device 422.

In a particular embodiment, input device 430 and power supply 444 are coupled to the system-on-chip device 422. Moreover, in a particular embodiment, as illustrated in FIG. 4, display 428, input device 430, speaker 436, microphone 438, wireless antenna 442, and power supply 444 are external to the system-on-chip device 422. However, each of display 428, input device 430, speaker 436, microphone 438, wireless antenna 442, and power supply 444 can be coupled to a component of the system-on-chip device 422, such as an interface or a controller.

It should be noted that although FIG. 4 depicts a wireless communications device, DSP 464 and memory 432 may also be integrated into a set-top box, a music player, a video player, an entertainment unit, a navigation device, a personal digital assistant (PDA), a fixed location data unit, or a computer. A processor (e.g., DSP 464) may also be integrated into such a device.

The foregoing disclosed devices and methods are typically designed and are configured into GDSII and GERBER computer files, stored on a computer readable media. These files are in turn provided to fabrication handlers who fabricate devices based on these files. The resulting products are semiconductor wafers that are then cut into semiconductor die and packaged into a semiconductor chip. The chips are then employed in devices described above.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for reducing interrupt latency time, comprising:
    communicating a first interrupt and a first vector identifier from a second interrupt controller to a first interrupt controller;
    processing the first interrupt and the first vector identifier at the first interrupt controller;
    sending the processed interrupt from the first interrupt controller to a thread in a core;
    determining when the core is ready to receive a second interrupt; and
    sending a single instruction from the core to the first interrupt controller indicating to the first interrupt controller that the first interrupt has been accepted for processing by the core and to the second interrupt controller indicating that the core is ready to receive the second interrupt.

2. The method of claim 1, wherein the single instruction is sent via a dedicated line from the core to a second level interrupt controller.

3. The method of claim 1, wherein the second interrupt controller is a level two interrupt controller, and the first interrupt controller is a level one interrupt controller.

4. The method of claim 1, wherein the single instruction is a Clear Interrupt Auto Disable (CIAD) instruction that operates by clearing a status indicating that the first interrupt is pending at the first interrupt controller.

5. The method of claim 4, wherein the Clear Interrupt Auto Disable (CIAD) instruction is a handshake mechanism between the second interrupt controller, the first interrupt controller, and the core.

6. The method of claim 1, wherein the core is a multi-threaded processor.

7. The method of claim 6, wherein determining when the core is ready to receive the second interrupt comprises identifying an idle thread to service the second interrupt.

8. The method of claim 6, wherein determining when the core is ready to receive the second interrupt comprises identifying a thread with a lowest priority to service the second interrupt.

9. The method of claim 1, wherein sending the single instruction from the core to the second interrupt controller indicating that the core is ready to receive the second interrupt comprises sending the single instruction from the core to the second interrupt controller indicating that the core is immediately ready to receive the second interrupt.

10. A multi-threaded processor, comprising:
a core;
a level one interrupt controller; and
a level two interrupt controller; and
a line coupling the core to the level two interrupt controller, wherein the core is configured to indicate to the level two interrupt controller, via the line that the core is ready to receive a level two interrupt,
wherein the core is configured to send a single instruction to the first interrupt controller indicating that a first interrupt has been accepted for processing by the core and to the second interrupt controller indicating that the core is ready to receive the level two interrupt.

11. The multi-threaded processor of claim 10, further comprising a dedicated hardware port configured to receive the level two interrupt from the level two interrupt controller.

12. The multi-threaded processor of claim 10, wherein the level two interrupt controller is configured to communicate the first interrupt and a first vector identifier to the first interrupt controller.

13. The multi-threaded processor of claim 12, wherein the level one interrupt controller is configured to process the first interrupt and first vector identifier and communicate the first interrupt to the core.

14. The multi-threaded processor of claim 13, wherein the core is configured to determine that the core is ready to receive a second level two interrupt based on the first interrupt communicated to the core.

15. The multi-threaded processor of claim 12, wherein the core indicates, via the line, that the core is ready to receive the level two interrupt by a Clear interrupt Auto Disable (CIAD) instruction.

16. The multi-threaded processor of claim 10, wherein the core is configured to determine that the core is ready to receive the level two interrupt via logic configured to identify a thread in the core to service the level two interrupt.

17. The multi-threaded processor of claim 16, wherein the logic is configured to identify a thread with a lowest priority to service a second interrupt.

18. The multi-threaded processor of claim 16, wherein the logic is configured to identify an idle thread to service a second interrupt.

19. The multi-threaded processor of claim 10 integrated in at least one semiconductor die.

20. The multi-threaded processor of claim 10, integrated into a device selected from the group consisting of a set top box, music player, video player, entertainment unit, navigation device, communications device, personal digital assistant (PDA), fixed location data unit, and a computer.

21. A processing system configured for reduced interrupt latency, the processing system comprising:
a first interrupt controller coupled to a core;
means for communicating a first interrupt and a first vector identifier from a second interrupt controller to the first interrupt controller;
means for processing the first interrupt and the first vector identifier at the first interrupt controller;
means for sending the processed interrupt to a thread in the core;
means for determining when the core is ready to receive a second interrupt; and
means for sending a single instruction from the core to the first interrupt controller indicating to the first interrupt controller that the first interrupt has been accepted for processing by the core and to the second interrupt controller indicating that the core is ready to receive the second interrupt.

22. The processing system of claim 21, wherein means for sending the single instruction comprises a dedicated line from the core to the second level interrupt controller.

23. The processing system of claim 21, wherein the single instruction is a Clear interrupt Auto Disable (CIAD) instruction.

24. The processing system of claim 21, wherein the core is a multi-threaded processor.

25. The processing system of claim 24, wherein the means for determining when the core is ready to receive the second interrupt comprises means for identifying an idle thread to service the second interrupt.

26. The processing system of claim 24, wherein the means for determining when the core is ready to receive a second interrupt comprises means for identifying a thread with a lowest priority to service the second interrupt.

27. The multi-threaded processor of claim 21 integrated in at least one semiconductor die.

28. The multi-threaded processor of claim 21, integrated into a device selected from the group consisting of a set top box, music player, video player, entertainment unit, navigation device, communications device, personal digital assistant (PDA), fixed location data unit, and a computer.

29. A non-transitory computer-readable storage medium comprising code, which, when executed by a processor, causes the processor to perform operations for reducing interrupt latency time, the non-transitory computer-readable storage medium comprising:
code for communicating a first interrupt and a first vector identifier from a second interrupt controller to a first interrupt controller;
code for processing the first interrupt and the first vector identifier at the first interrupt controller;
code for sending the processed interrupt from the first interrupt controller to a thread in a core;
code for determining when the core is ready to receive a second interrupt; and
code for sending a single instruction from the core to the first interrupt controller indicating to the first interrupt controller that the first interrupt has been accepted for processing by the core and to the second interrupt controller indicating that the core is ready to receive the second interrupt.

* * * * *